(12) United States Patent  (10) Patent No.: US 8,767,598 B2
Rajamani                   (45) Date of Patent:     Jul. 1, 2014

(54) METHODS AND APPARATUSES FOR TRANSMITTING ENERGY-SAVING INDICATOR IN FRAMES

(75) Inventor: Krishnan Rajamani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1197 days.

(21) Appl. No.: 12/060,823

(22) Filed: Apr. 1, 2008

(65) Prior Publication Data

US 2009/0245280 A1    Oct. 1, 2009

(51) Int. Cl.
G08C 17/00   (2006.01)
H04B 1/16    (2006.01)
H04W 52/02   (2009.01)
H04W 72/12   (2009.01)

(52) U.S. Cl.
CPC ........... H04W 52/0235 (2013.01); *Y02B 60/50* (2013.01); *H04W 72/1278* (2013.01)
USPC ..... 370/311; 370/318; 455/343.1; 455/343.2; 455/343.5

(58) Field of Classification Search
CPC .................................................. H04W 52/02
USPC .......... 370/311, 318; 455/343.1, 343.2, 343.5
See application file for complete search history.

(56) References Cited

U.S. PATENT DOCUMENTS

| 6,112,148 A | 8/2000 | Baraban et al. | |
| 2003/0103451 A1* | 6/2003 | Lutgen et al. | 370/229 |
| 2003/0153369 A1 | 8/2003 | Laiho et al. | |
| 2005/0213534 A1* | 9/2005 | Benveniste | 370/328 |
| 2006/0133304 A1 | 6/2006 | Tanach | |
| 2006/0252440 A1 | 11/2006 | Sugaya | |
| 2007/0016654 A1 | 1/2007 | Bowles et al. | |

(Continued)

FOREIGN PATENT DOCUMENTS

| CN | 1701589 A | 11/2005 |
| JP | 2002319886 A | 10/2002 |

(Continued)

OTHER PUBLICATIONS

International Search Report—PCT/US2009/037454—International Search Authority—European Patent Office, Aug. 6, 2009.

(Continued)

*Primary Examiner* — Brandon Renner
*Assistant Examiner* — Abdelnabi Musa
(74) *Attorney, Agent, or Firm* — QUALCOMM IP Department; James Hunt Yancey, Jr.

(57) ABSTRACT

In embodiments, a transmitting device sends a time reference field to a receiving device when indicating that no more frames will be sent to the receiving device. The time reference informs the receiving device of the length of time that the transmitting device has committed not to transmit to the receiving device. When operating in conformance with the ECMA-368 standard, the time reference allows the transmitting device to control the length of the commitment period after the MORE FRAMES bit is set to zero. In this way, the commitment not to transmit may be made for a shorter time than the time until the beginning of the following Distributed Reservation Protocol (DRP) reservation block or the time to the beginning of the following superframe. The time reference may be added in the Medium Access Control header or included in a vendor-specific message, for example.

38 Claims, 5 Drawing Sheets

(56) References Cited

U.S. PATENT DOCUMENTS

| | | | |
|---|---|---|---|
| 2007/0104215 A1 | 5/2007 | Wang et al. | |
| 2007/0183424 A1* | 8/2007 | Ametsitsi | 370/392 |
| 2007/0259662 A1 | 11/2007 | Lee et al. | |
| 2007/0291636 A1 | 12/2007 | Rajagopal et al. | |
| 2008/0013658 A1 | 1/2008 | Lewis et al. | |
| 2008/0045159 A1 | 2/2008 | Mashimo et al. | |
| 2008/0212525 A1* | 9/2008 | Tervonen et al. | 370/329 |
| 2008/0253327 A1* | 10/2008 | Kohvakka et al. | 370/330 |
| 2009/0040984 A1 | 2/2009 | Rajamani | |
| 2009/0141737 A1* | 6/2009 | Ho | 370/447 |

FOREIGN PATENT DOCUMENTS

| | | |
|---|---|---|
| JP | 2005518155 A | 6/2005 |
| JP | 2006093788 A | 4/2006 |
| JP | 2006313976 | 11/2006 |
| JP | 2007525891 A | 9/2007 |
| JP | 2007306057 | 11/2007 |
| JP | 2009505483 A | 2/2009 |
| JP | 2009515400 A | 4/2009 |
| WO | 03069886 A2 | 8/2003 |
| WO | WO2005022781 A1 | 3/2005 |
| WO | 2006067271 A1 | 6/2006 |
| WO | 2007021115 A1 | 2/2007 |

OTHER PUBLICATIONS

Written Opinion—PCT/US2009/037454, International Search Authority, European Patent Office, Aug. 6, 2009.

Taiwan Search Report—TW098110237—TIPO—Aug. 13, 2012.

* cited by examiner

METHODS AND APPARATUSES FOR TRANSMITTING ENERGY-SAVING INDICATOR IN FRAMES

BACKGROUND

1. Field

The present invention relates generally to communications. More particularly, in aspects the invention relates to an energy-saving indicator in a transmission frame.

2. Background

Portability and functionality of wireless communication devices continue to improve, contributing to the proliferation of wireless communication networks. Many conventionally-wired connections are being replaced with wireless connections, including ad hoc connections made when one wireless device moves into the connectivity area of another wireless device. Of some interest are wireless personal area networks (wireless PANs or WPANs), which are networks that are often used for communications between or among devices close to one person. The reach of a PAN is typically of the order of ten meters, although some networks operate over distances three or even ten times as long. A personal area network may be used for communications between or among personal devices, or for communications between such personal devices and higher level networks, including the Internet. A wireless personal area network may be implemented using ultra-wide band (UWB) technologies.

ECMA-368 is a high rate physical (PHY) layer and medium access control (MAC) standard promulgated by ECMA International for UWB communications. This standard is based on the WiMedia UWB Common Radio Platform. At this time, the latest version of the ECMA-368 standard is the 2nd edition dated Dec. 2007.

Portable devices are typically battery-powered. Energy conservation is therefore important in such devices for keeping the batteries small without unduly compromising battery life.

Substantial energy may be expended in a portable device keeping the device's radio frequency receiver operational during times when no transmissions are directed to the device. Although the receiver may be turned off between transmissions, the precise times of incoming data are not always known in advance. Transmission times may also not be susceptible to prediction, even on the transmitter side, because the MAC layer of the transmitter may not be able to predict data flow from a given application. One technique for receiver energy conservation is for the transmitter to inform the receiver whether to expect additional transmissions during the current transmission period. The use of a simple flag (as defined in the ECMA-368 standard) to signal the receiver that no transmissions will be made for a period create a conflict between energy conservation and the ability to accommodate bursty and asynchronous data sources. If new data from the application becomes available for transmission shortly after the transmitter signals that no additional transmissions will be made, then data latency and buffer overrun probability at the transmitter may increase.

A need exists in the art for apparatus, methods, and articles of manufacture that improve energy efficiency of wireless receivers. A need also exists for apparatus, methods, and articles of manufacture that decrease latency of wireless transmissions and reduce or eliminate the probability of transmitter buffer overruns. A need further exists for apparatus methods, and articles of manufacture that allow reduction in the receiver on/off duty cycle and at the same time avoid excessive transmission latency and buffer overruns in wireless networks, including networks with devices having ECMA-368 PHY and MAC.

SUMMARY

Embodiments disclosed herein may address one or more of the above stated needs by providing apparatus, methods, and articles of manufacture for including in a superframe a time reference along with a "no more frames" indicator that informs the receiver that no frames will be transmitted. The time reference may indicate, for example, a specific number of time slots or microseconds during which no transmission will be made to the particular receiver.

A method is disclosed for sending wireless transmissions. The method includes determining that payload data for transmitting from a first device to a second device is unavailable. The method also includes, when the payload data is unavailable, transmitting a first value of an indicator from the first device to the second device, and transmitting a first time reference value from the first device to the second device. The first value of the indicator indicates that the first device will not transmit to the second device for a first period of time, and the first period of time has a length defined by the first time reference value.

A wireless apparatus is disclosed, including a memory, a receiver, a transmitter, and a controller coupled to the receiver, the transmitter, and the memory. The controller is configured to determine that payload data for transmitting from the wireless apparatus to a wireless device is unavailable. If the payload data is unavailable, the controller is configured to transmit a first value of an indicator from the wireless apparatus to the wireless device, and transmit a first time reference value from the wireless apparatus to the wireless device. The first value of the indicator indicates that the wireless apparatus will not transmit to the wireless device for a first period of time having a length defined by the first time reference value.

A machine-readable medium storing instructions is disclosed. When the instructions are executed by at least one controller of a wireless apparatus, the instructions cause the wireless apparatus to perform a number of steps. The steps include determining that payload data for transmitting from the wireless apparatus to a wireless device is unavailable. The steps also include, when the payload data is unavailable, transmitting a first value of an indicator from the wireless apparatus to the second device, and transmitting a first time reference value from the wireless apparatus to the second device. The first value of the indicator indicates that the wireless apparatus will not transmit to the wireless device for a first period of time, and the first period of time has a length defined by the first time reference value.

A wireless apparatus is disclosed. The apparatus includes a means for storing data, a means for receiving data over a wireless medium, a means for transmitting data over the wireless medium, and a controller means for controlling the means for receiving and the means for transmitting. The controller means is configured to determine that payload data for transmitting from the wireless apparatus to a wireless device is unavailable. The controller means is also configured, when the payload data is unavailable, to transmit a first value of an indicator from the wireless apparatus to the wireless device, and to transmit a first time reference value from the wireless apparatus to the wireless device. The first value of the indicator indicates that the wireless apparatus will not transmit to the wireless device for a first period of time defined by the first time reference.

A method of operating a wireless device is disclosed. The method includes receiving an indicator from a wireless apparatus, and determining whether the indicator has a first value or a second value. In response to the indicator having the first value, the method includes receiving a time reference value from the wireless apparatus, selecting a length of time corresponding to the time reference value, turning at least part of a receiver of the wireless device to an off state for the length of time, and turning the at least part of the receiver to an on state upon expiration of the length of time.

A wireless device is disclosed. The wireless device includes a memory, a receiver, a transmitter, and a controller. The controller is coupled to the receiver, the transmitter, and the memory. The controller is configured to receive an indicator from a wireless apparatus, and determine whether the indicator has a first value or a second value. The controller is also configured, in response to the indicator having the first value, to receive a time reference value from the wireless apparatus, select a length of time corresponding to the time reference value, turn at least part of the receiver to an off state for the length of time, and turn the at least part of the receiver to an on state upon expiration of the length of time.

A machine-readable medium storing instructions is disclosed. When the instructions are executed by at least one controller of a wireless device, the instructions cause the wireless device to perform a number of steps. The steps include receiving an indicator from a wireless apparatus. The steps also include determining whether the indicator has a first value or a second value. The steps further include, in response to the indicator having the first value, receiving a time reference value from the wireless apparatus, selecting a length of time corresponding to the time reference value, turning at least part of a receiver of the wireless device to an off state for the length of time, and turning the at least part of the receiver to an on state upon expiration of the length of time.

A wireless device is disclosed. The wireless device includes a means for storing data, a means for receiving data over a wireless medium, a means for transmitting data over the wireless medium, and a controller means for controlling the means for receiving and the means for transmitting. The controller means is configured to receive an indicator from a wireless apparatus, and determine whether the indicator has a first value or a second value. The controller means is also configured, in response to the indicator having the first value, to receive a time reference value from the wireless apparatus, select a length of time corresponding to the time reference value, turn at least part of the means for receiving to an off state for the length of time, and turn the at least part of the means for receiving to an on state upon expiration of the length of time.

These and other aspects of the present invention will be better understood with reference to the following description, drawings, and appended claims.

DETAILED DESCRIPTION

In this document, the words "embodiment," "variant," and similar expressions are used to refer to particular apparatus, process, or article of manufacture, and not necessarily to the same apparatus, process, or article of manufacture. Thus, "one embodiment" (or a similar expression) used in one place or context may refer to a particular apparatus, process, or article of manufacture; the same or a similar expression in a different place may refer to a different apparatus, process, or article of manufacture. The expressions "alternative embodiment," "alternatively," and similar phrases may be used to indicate one of a number of different possible embodiments. The number of possible embodiments is not necessarily limited to two or any other quantity.

The word "exemplary" may be used herein to mean "serving as an example, instance, or illustration." Any embodiment or variant described herein as "exemplary" is not necessarily to be construed as preferred or advantageous over other embodiments or variants. All of the embodiments and variants described in this description are exemplary embodiments and variants provided to enable persons skilled in the art to make and use the invention, and not necessarily to limit the scope of legal protection afforded the invention.

Figure 1:
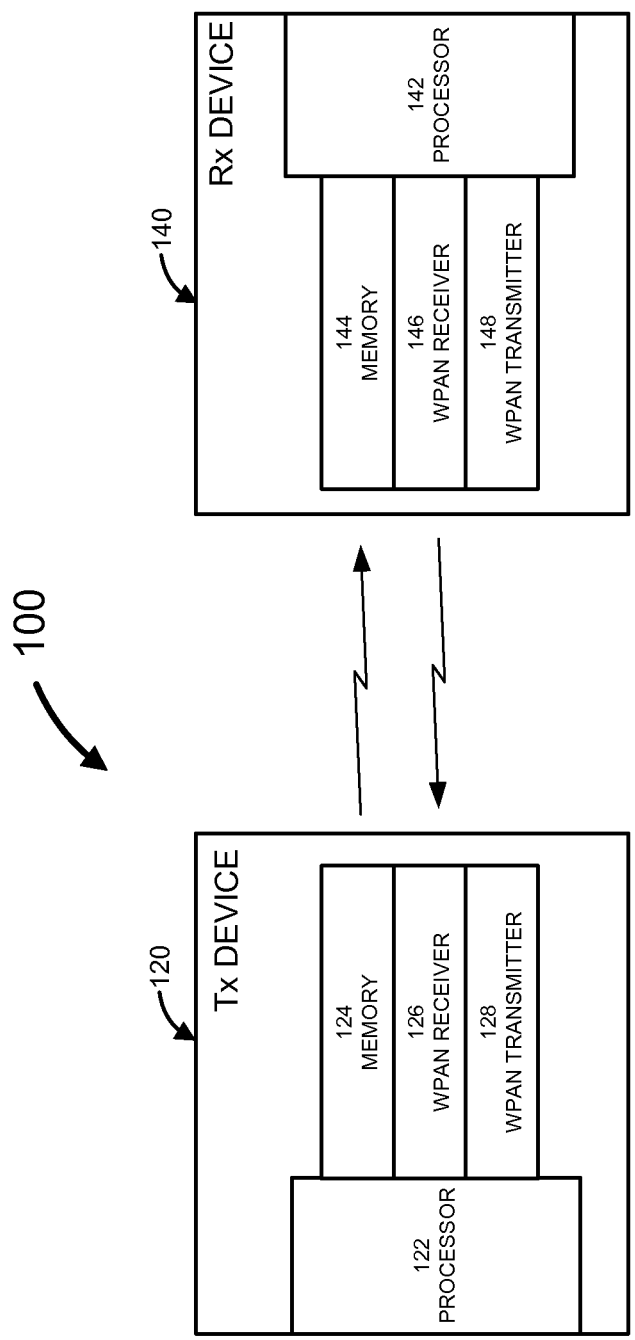
FIG. 1 illustrates selected components of a wireless transmitting device and a wireless receiving device communicating with each other over a wireless communication network.

FIG. 1 illustrates selected components of a wireless device 120 and a wireless device 140 communicating with each other over a wireless network 100. The network 100 may be a wireless personal area network allowing communications up to ten meters, up to thirty meters, or up to one hundred meters. The network 100 may be an ad hoc network set up between the devices 120 and 140.

The device 120 includes a processor 122, a memory 124, a receiver 126 for receiving wireless communications from the device 140 and other wireless devices of the network 100, and a transmitter 128 for sending communications to the device 140 and to other wireless devices of the network 100. The memory 124, the receiver 126, and the transmitter 128 are coupled to the processor 122, which can configure, read, and/or write to these components. The processor 122 may execute instructions stored in the memory 124 to configure itself and the transmitting device 120 to perform the steps of the transmitting device processes described in this document.

The device 140 similarly includes a processor 142, a memory 144, a receiver 146 for receiving communications from the device 120 and from other wireless devices of the network 100, and a transmitter 148 for sending communications to the device 120 and other wireless devices of the network 100. The memory 144, the receiver 146, and the transmitter 148 are coupled to the processor 142, which can configure, read, and/or write to these components. The processor 142 may execute instructions stored in the memory 144 to configure itself and the receiving device 140 to perform the steps of the receiving device processes described in this document.

Each of the processors 122 and 142 may include, for example, one or more microprocessors, one or more digital signal processors, one or more state machines, or a combination of such devices. Each of the memories 124 and 144 may be internal or external to the corresponding processor (122 or 142), and may include random access memory (RAM), read-only memory (ROM), programmable ROM (PROM), erasable PROM (EPROM), electrically erasable EPROM (EEPROM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), magnetic storage, and/or other memories.

Each of the devices 120 and 140 may have additional elements, including keyboards, displays, pointing devices, and receivers and transmitters designed to communicate with other networks, including cellular and local area networks (LANs). The cellular networks may operate, for example, under UTRAN or UMTS Terrestrial Radio Access Network standards, including code division multiple access (CDMA) and Global System for Mobile Communication (GSM) network standards.

The devices 120 and 140 may use a wireless communication protocol, such as a wireless protocol implementing MAC and PHY layer in accordance with the UWB WiMedia standard ECMA-368. The ECMA-368 standard supports radio link data rates up to 480 Mb/s, with higher rates envisioned in the future. The radio data link uses orthogonal frequency division modulation (OFDM) with 128 frequency subcarriers. Data transmissions are sent over the same physical channel in 256-μs Medium Access Slots (MASs) organized in repeating "superframes" of 256 MASs, so that each superframe is 65.536 ms in duration. Each MAS may be used to send up to three maximum-sized data frames. Beacons are placed in the beginning of each superframe, extending over one or possibly more MASs. Beacons allow network devices to discover and synchronize with each other, and also convey certain overhead information. In particular, beacons may carry announcements of MAS reservations under a Distributed Reservation Protocol (DRP) for isochronous and other traffic. A reservation block may correspond to one or several temporally contiguous MASs in a reservation not adjacent to other MASs in the same reservation; the reserving device has preferred or exclusive access to the communication medium during a reservation block. A device may reserve, for example, three DRP reservation blocks in a superframe. The reserved blocks may vary in length. DRP transmissions may be made using hard reservations, soft reservations, or private reservations, as is explained in more detail in the ECMA-368 standard.

Under the current ECMA-368 standard, a device may operate in an active mode, transmitting and receiving beacons in each superframe. A device may also operate in a power-saving hibernation mode for one or several superframes during which the device does not receive or transmit. In the active mode, a device may be either in an awake cycle or in a sleep cycle. An awake device can both transmit and receive. A device that is in the sleep cycle neither receives nor transmits.

A bit known as "MORE FRAMES" is used in the ECMA-368 standard to control allowed transitions of an active receiving device to the sleep cycle. The significance of this bit varies between DRP reservation transmissions (mentioned above) and transmissions via Prioritized Contention Access (PCA) scheme.

When a transmitting device has successfully completed transmission of all traffic pending for transmission in the current DRP reservation block, the device sets the MORE FRAMES bit to zero in the last transmitted frame of the block. The receiving device is then assured that no additional traffic will be sent to it from the transmitting device until the beginning of the next reservation block in the same superframe, and can enter the sleep cycle until a specified guard time preceding the next reservation block. If the reservation block in which the transmitting device set the MORE FRAMES bit to zero is the last reservation block in the superframe, the receiving device can then enter the sleep cycle until some specified guard time immediately preceding the next beacon period (subject to other conditions, such as reservations of another transmitting device). Conversely, if the MORE FRAMES bit is set to one during transmission in a DRP reservation block, the transmitter may send additional traffic in the block and the receiver may not enter the sleep cycle during the reservation block.

The PCA scheme functions in a slightly different way. Once a transmitting device completes transmission of all traffic pending for transmission via the PCA scheme in the current superframe, the transmitting device sets the More Frames bit to zero. The transmitting device does this in the last frame it transmits to a particular receiving device using PCA during the superframe. The particular receiving device then knows that no additional transmissions will be made from the transmitting device until the next superframe, and can enter the sleep cycle until a predetermined guard time before the next beacon period. PCA transmissions may be unreserved, PCA DRP, or PCA transmissions during Soft DRP, as is explained in more detail in the ECMA-368 standard.

Note that once the MORE FRAMES bit is set to zero in either of the two transmission schemes (DRP reservation or PCA), the granularity of time during which the transmitting device may not transmit to the receiving device may be quite large. At the same time, the arrival of data from an application in the transmitting device may not be predictable, and the data may be bursty. At peak transmission rate, a 4 kilobyte packet corresponds to about 80 μsec (one frame) duration, and consequently a MAS corresponds to 12 kilobytes. Many tens of MASs may have to be missed until the transmitting device that set the MORE FRAMES bit to zero is able to resume transmission to the receiving device.

In accordance with variants of the network 100, a transmitting device (for example, the device 120) is configured to transmit to the receiving device (for example, to the device 140) a time reference field with a time reference value. The time reference value indicates the length of the time period during which the transmitting device 120 will not transmit to the receiving device. The device 120 may send the time reference value when setting the MORE FRAMES to a value indicating that no transmissions will be made to the receiving device 140, or at other times. The time reference may be transmitted in the MAC header under a modified transmission protocol standard. For example, the time reference may be conveyed in enhanced MAC header of Data frames, Zero-length Data frames, or Command frames. The time reference may also be transmitted in vendor-specific Command Frame payload, or vendor-specific Control Frame payload, which are allowed under the current version of the ECMA-368 standard.

The receiving device is configured to receive the MORE FRAMES bit, and the value in the time reference field. The receiving device translates the value of the received time reference field into a time through which the device 120 has guaranteed no transmissions. The device 140 can then turn off its receiver to enter the sleep cycle until such time. Of course, turning off the receiver may be contingent on other conditions, such as no transmissions being expected for the receiving device from any transmitting devices in addition to the device 120.

The time reference value may be provided, for example, in milliseconds, in microseconds, in a number of MAS(s) or other units, or according to some transformation table relating a limited number of possible discrete values in the time reference field to the same number of different time reference periods. The relationship between the value in the time reference field may progress linearly, for example, increasing by 10 (or 12, or 20, or 50, or some other fixed number) microseconds with each increase of 1 in the value of the time reference field. The relationship may also progress non-linearly with increases in the value of the time reference field. The non-linear progression may be, for example, a substantially geometric (exponential) sequence such as this one: 1,000 μsecs, 2,000 μsecs, 4,000 μsecs, 8,000 μsecs, 16,000 μsecs, and 32,000 μsecs. A relatively small number of bits in the field can thus accommodate a large variation in the time reference. The progression may also be other than linear or geometric. The units can vary from microseconds to MASs to some other constant. The time reference may be given in absolute or relative terms. If the unit is MAS, for example, then the time reference may be an absolute MAS number, or MAS number relative to the current MAS. If the unit is microsecond, then the time reference may be relative to the start or end of the superframe, or relative to the frame containing the time reference.

The time reference may be added to the protocol for data transmissions using the DRP reservation scheme, the PCA scheme, or both PCA and DRP schemes within the same superframe. Note that the length of the time reference field in bits may vary or may be the same for the two schemes. Note also that the translation of the value of the time reference field into microseconds, MASs, or other units may also be the same or may differ under the two schemes. References to PCA include PCA transmissions during a Soft DRP by devices other than the Soft DRP Owner, as is described in the ECMA-368 standard.

Figure 2:
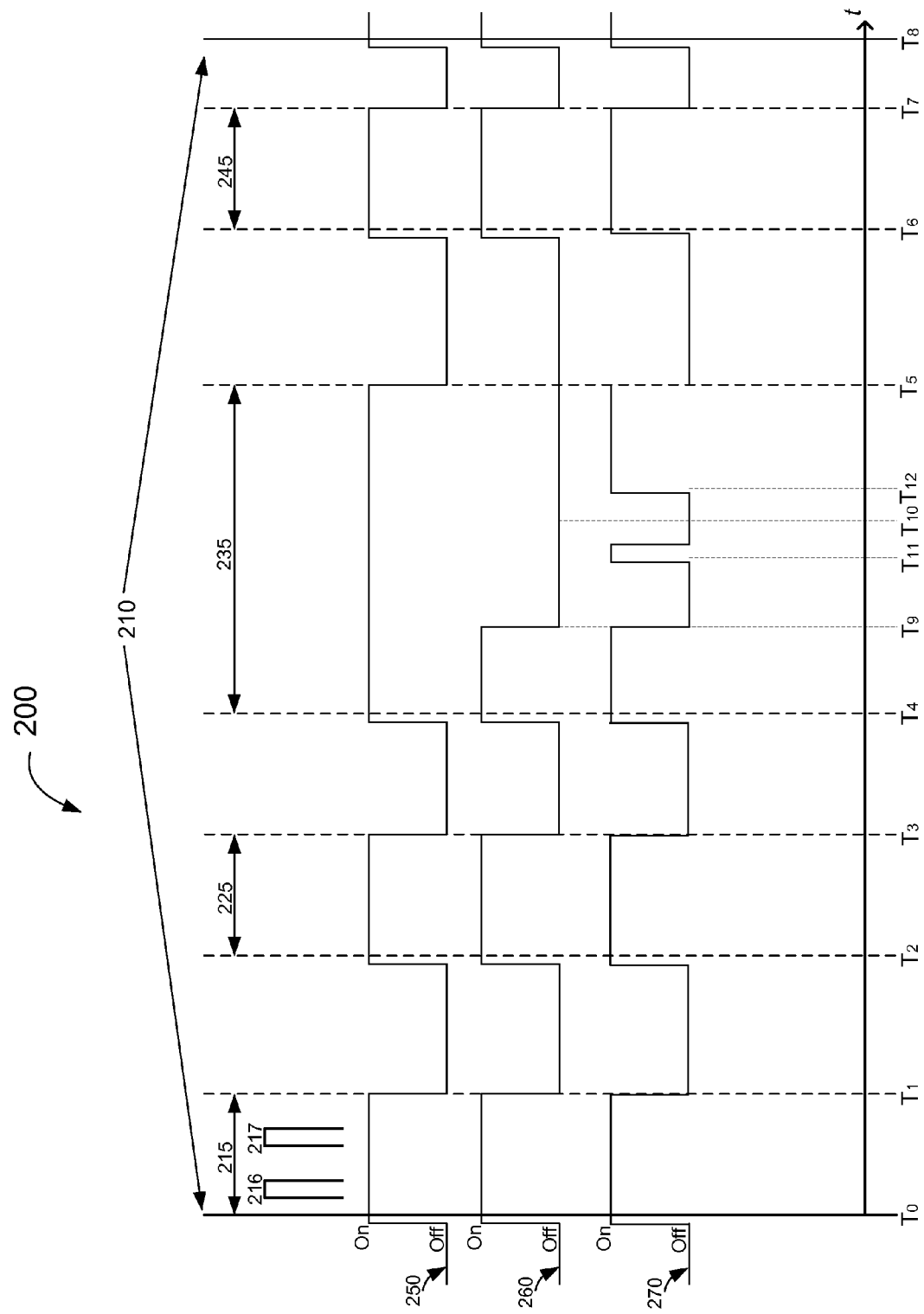
FIG. 2 illustrates selected timing aspects of superframe transmissions according to Distributed Reservation Protocol reservation scheme modified with addition of a time reference.

FIG. 2 illustrates selected timing aspects 200 of transmissions in a superframe 210 from the transmitting device 120 to the receiving device 140 according to the DRP reservation scheme modified with the addition of the time reference. The superframe 210 includes, among other features, a beacon period 215 during which the two devices send their own beacons and listen for other devices' beacons. The following superframe begins at $T_8$. The beacon period 215 starts at $T_0$, the beacon period start time (BPST), and ends at $T_1$. Two beacons 216 and 217 are shown within the beacon period 215; these are the beacons of the transmitting device 120 and the receiving device 140, shown in no particular order. There may be other beacons from additional devices transmitted during the beacon period 215. The superframe 210 also includes reservation blocks 225 ($T_2$ to $T_3$), 235 ($T_4$ to $T_5$), and 245 ($T_6$, to $T_7$), for transmitting from the device 120 to the device 140 using the DRP reservation scheme. More or fewer reservation blocks may appear in any given superframe.

Line 250 represent On and Off states of the receiver of the device 140 to enable the device 140 to receive the transmissions from the device 120 during the reservation blocks 225, 235, and 245. Note that the receiver should turn on some short guard time before the beacon period 215 and before each of the reservation blocks 225/235/245, to make sure that the receiver is operational by the time of an incoming transmission. During other times, the receiver may be turned off and the device 140 can be in the sleep cycle. (This example assumes that no transmissions from any other devices to the device 140 are expected in the superframe 210.) Thus, the line 250 may represent the actual On/Off states of the receiver of the device 140 configured for energy conservation through the use of the sleep cycle when the transmitting device 120 uses the entire bandwidth reserved in the superframe 210 for its transmissions to the device 140.

Line 260 represent possible On and Off states of the receiver of the device 140 to enable the device 140 to receive the transmissions from the device 120 during the reservation blocks 225/235/245 when the transmitting device 120 runs out of data some time during the reservation block 235; the transmitting device 120 then again has data for transmission to the device 140, occupying the entire reservation block 245. In this case, the transmitting device 120 sets the MORE FRAMES bit to zero during the reservation block 235, and, in response, the device 140 turns its receiver Off at a time $T_9$. Without the time reference discussed above, if the device 120 receives additional traffic for transmission to the device 140 at a time $T_{10}$, shortly after setting the MORE FRAMES bit to zero, it will not be able to send the traffic at least until the time $T_6$ when the next reservation block 245 begins. The delay may cause buffer overflow and increased latency. To avoid these problems, the device 120 may delay setting the MORE FRAMES bit to zero. The device 120 may also not set the bit to zero at all, in which case the On and Off states of the receiver would be the same as are represented by the line 250.

Line 270 represent possible On and Off states of the receiver of the device 140 to enable the device 140 to receive the transmissions from the device 120 during the reservation blocks 225/235/245 under the same conditions as are described in the immediately preceding paragraph. Here, however, the devices 120 and 140 are configured to operate under a modified transmission protocol that includes a time reference for the MORE FRAMES bit. When the transmitting device 120 runs out of data during the reservation block 235 and sets the MORE FRAMES bit to zero, it also determines the value of the time reference field and transmits the field to the device 140. The determination may be made, for example, based on a preprogrammed constant value, conditions such as a statistical pattern of arrival of the data for transmission to the device 140, the time of day, the status of the device 140 (such as sensitivity of the receiving device to power savings and its current battery charge level), sensitivity of the application of the transmitting device that sends traffic to the receiving device to latency and throughput of the traffic, knowledge of source traffic patterns, combinations of these and other factors, or otherwise. The device 140 turns its receiver Off at the time $T_9$ upon receiving the zero value of the MORE FRAMES bit, and configures itself to turn its receiver On upon expiration of the period corresponding to the value of the time reference field. For example, the device 140 turns its receiver back to the On state just before a time $T_{11}$ that corresponds to the time reference. At this time, the transmitting device 120 may transmit traffic to the receiving device 140 once again. If the device 120 does not have traffic for transmission to the device 120 at this time, it may set the MORE FRAMES bit to zero again and transmit an appropriate value in the time reference field, as is assumed in this example. The second value in the time reference filed transmitted at this time (following $T_{11}$) may be the same as the first value (transmitted just before $T_9$), or the two values may differ; the transmitting device may determine the value of the time reference, for example, in substantially real time, i.e., at the time the transmitting device determines to set the MORE FRAMES bit to zero, or the device may do so less frequently. The device 140 will then turn its receiver Off until just before a time $T_{12}$ corresponding to the latest time reference. Assuming that the device 120 has by now received traffic data for transmission to the device 140, at the time $T_{10}$, it sets the MORE FRAMES bit to one and begins transmitting the traffic to the device 140 at time $T_{12}$.

Figure 3:
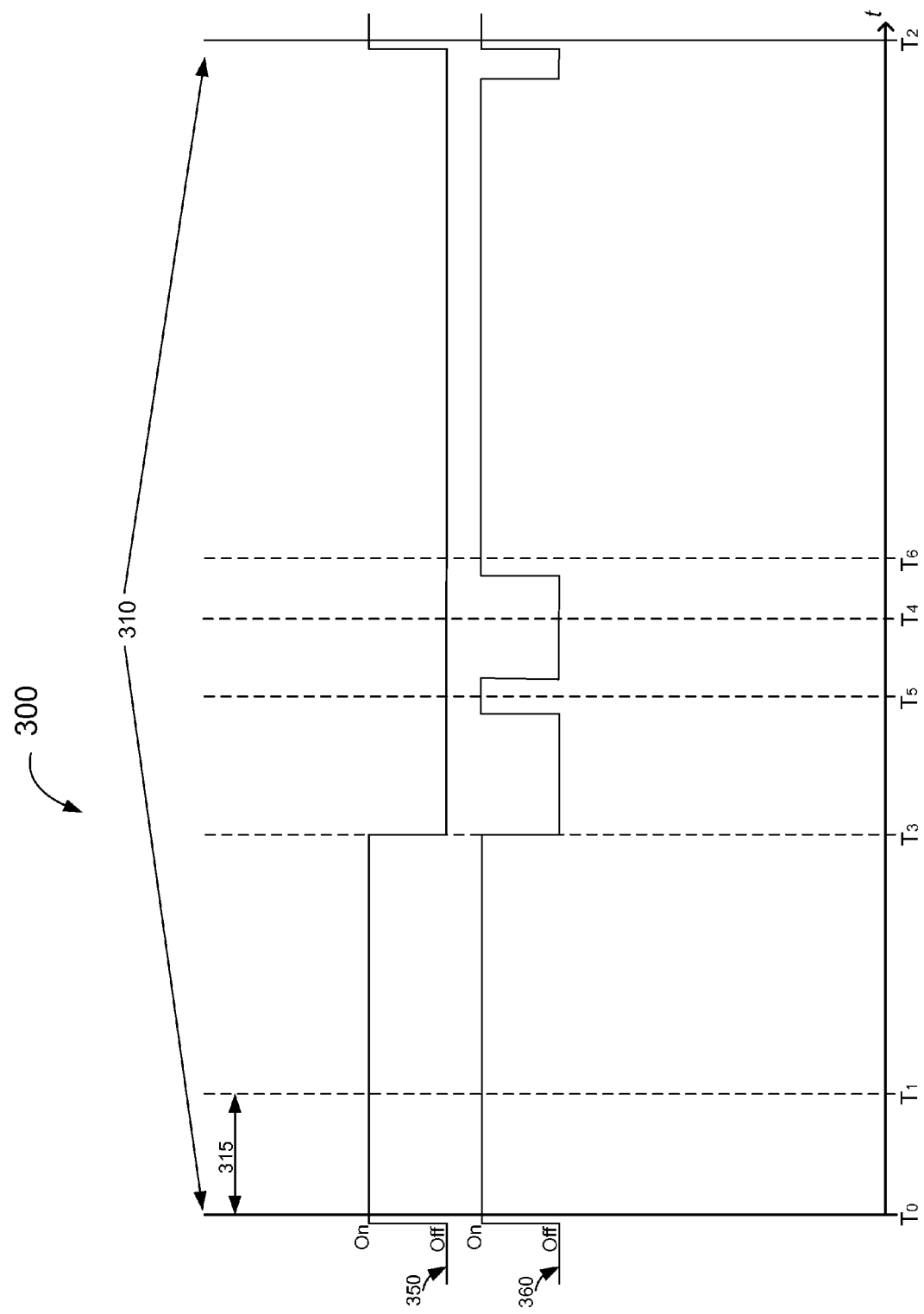
FIG. 3 illustrates selected timing aspects of superframe transmissions according to Prioritized Contention Access scheme modified with the addition of a time reference.

FIG. 3 illustrates selected timing aspects 300 of transmissions in a superframe 310 from the transmitting device 120 to the receiving device 140 according to the PCA scheme modified with the addition of a time reference. The superframe 310 begins at $T_0$ and includes, among other features, a beacon period 315 ($T_0$ to $T_1$) during which the two devices send their own beacons and listen for other devices' beacons. The following superframe begins at $T_2$.

Line 350 represent On and Off states of the receiver of the device 140 to enable the device 140 to receive the transmissions from the device 120 during the superframe 310. Because the PCA scheme is contention based, the device 140 keeps its receiver in the On state until it receives all the frames from the device 120 for the superframe 310. That is, the device 140 keeps its receiver on until the device 120 sets the MORE FRAMES bit to zero. In FIG. 3, this takes place at a time $T_3$. Without a time reference for the MORE FRAMES bit, the device 120 is not allowed to transmit to the device 140 until the next superframe, whether the device 120 has new traffic for the device 140 or not. If the device 120 receives application data for transmission to the device 140 at a time $T_4$, the data has to wait until some time after $T_2$. The delay may cause buffer overflow and increased latency. To avoid these problems, the device 120 may delay setting the MORE FRAMES bit to zero. The device 120 may also not set the bit to zero at all, in which case the receiver will be On for the duration of the superframe 310. Note that FIG. 3 assumes that the beacon from device 140 includes the PCA Availability IE with the TIM IE Required bit set to ONE. This is an ECMA-368 pre-requisite for the use of MORE FRAMES in PCA transmissions. For the sake of simplicity in illustration, FIG. 3 assumes that the PCA Availability IE from device 140 indicates availability in all MAS.

Line 360 represent possible On and Off states of the receiver of the device 140 to enable the device 140 to receive the transmissions from the device 120 during the superframe 310, with the devices 120 and 140 configured to operate under a modified transmission protocol that includes a time reference for the MORE FRAMES bit.

When the transmitting device 120 runs out of data, it sets the MORE FRAMES bit to zero. The device 120 also determines the value of the time reference field and transmits the field to the device 140. The determination may be made, for example, based on a preprogrammed constant value, conditions such as a statistical pattern of arrival of the data for transmission to the device 140, the time of day, the status of the device 140 (such as sensitivity of the receiving device to power savings and its current battery charge level), sensitivity of the application of the transmitting device that sends traffic to the receiving device to latency and throughput of the traffic, knowledge of source traffic patterns, combinations of these and other factors, or otherwise. The device 140 turns its receiver Off at the time $T_3$ upon receiving the zero value of the MORE FRAMES bit, and configures itself to turn its receiver On upon expiration of the period corresponding to the value of the time reference field. For example, the device 140 turns its receiver back to the On state just before a time $T_5$ that corresponds to the time reference. At this time, the transmitting device 120 may transmit traffic to the receiving device 140 once again. If the device 120 does not have traffic for transmission to the device 120 at this time, it may set the MORE FRAMES bit to zero again and transmit an appropriate value in the time reference field, as is assumed in this example. The second value in the time reference filed transmitted at this time (following $T_5$) may be the same as the first value (transmitted just before $T_3$), or the two values may differ; the transmitting device may determine the value of the time reference, for example, in substantially real time, i.e., at the time the transmitting device determines to set the MORE FRAMES bit to zero, or the device may do so less frequently. The device 140 will then configure itself to turn its receiver Off until just before a time $T_6$ corresponding to the latest time reference. Assuming that the device 120 has now received traffic for transmission to the device 140 (at the time $T_4$), it sets the MORE FRAMES bit to one and begins transmitting the traffic to the device 140 at time $T_6$. The data may fill substantially all of the remainder of the superframe 310 (or substantially all of the remaining parts of the superframe 310 that become available to the device 140). The data may also run out before the end of the superframe 310, in which case the process of setting the MORE FRAMES bit to zero and sending an appropriate time reference may be repeated.

Figure 4:
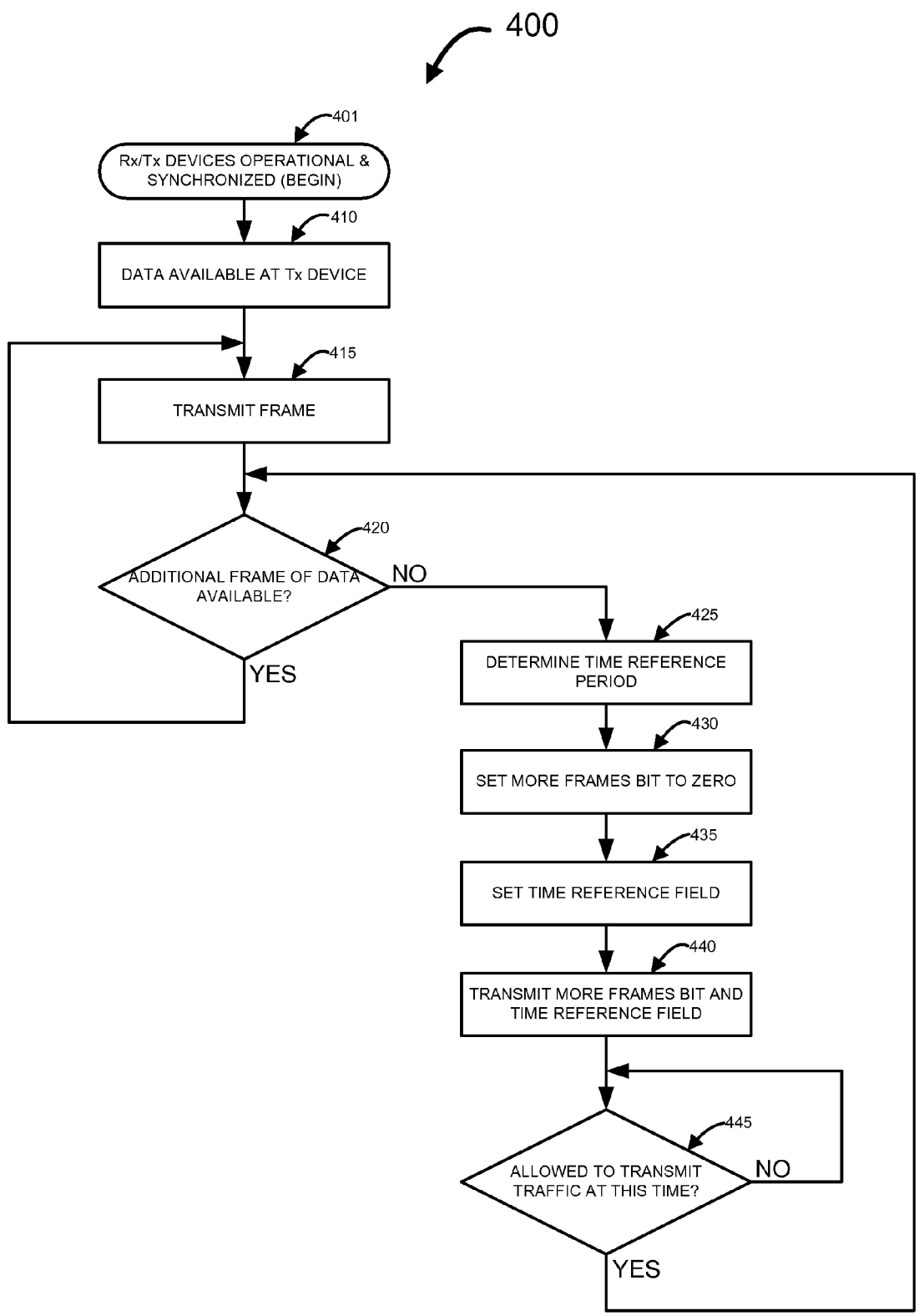
FIG. 4 illustrates selected steps and decision blocks of a process for transmitting traffic from the transmitting device to the receiving device in accordance with the modified protocol that includes the time reference.

FIG. 4 illustrates selected steps of a process 400 for transmitting traffic from the transmitting device 120 to the receiving device 140 in accordance with the modified protocol that includes a time reference with the MORE FRAMES bit.

At flow point 401, the transmitting and the receiving devices are operational and synchronized with each other.

At step 410, the transmitting device determines that traffic data is available for transmission to the receiving device.

At step 415, the transmitting device transmits a frame of the data to the receiving device using the applicable scheme. The transmission can take place in the DRP reservation blocks or through Prioritized Contention Access.

In decision block 420, the transmitting device determines whether additional traffic data are available. If so, process flow returns to the step 415. If there are no more data to transmit to the receiving device, process flow proceeds to step 425, to determine the length of the time reference period that will accompany setting of the MORE FRAMES bit to zero. In some variants the time reference period may be predetermined, and the time reference period may be provided at the time of device synchronization. The time reference period may be shorter than the time remaining until the next following superframe, and it may be shorter than the time remaining until the next following DRP reservation block.

At step 430, the transmitting device sets the MORE FRAMES bit to zero.

At step 435, the transmitting device sets the value of the field conveying the time reference.

At step 440, the transmitting device transmits the MORE FRAMES bit and the time reference field to the receiving device.

In decision block 445, the transmitting device determines whether it is allowed to transmit to the receiving device at the current time. In case of the DRP reservation scheme, for example, this determination may include detecting expiration of the timer set to expire at the end of the time period defined by the last time reference value, and determining whether the current time falls within a DRP reservation block. In case of the PCA scheme, for example, the determination may include detecting expiration of the timer, determining whether the PCA Availability IE of the receiving device includes the current MAS, and determining whether contention for transmission to the receiving device was successful. If the transmitting device is allowed to transmit, process flow returns to the decision block 420, and repeats the steps and decision 420 through 445. If the transmitting device is not allowed to transmit, process flow loops back to the input of the decision block 445.

Note that FIG. 4 assumes that a dummy data packet (without actual payload traffic), a command packet, or a control packet is sent at step 440. In other embodiments, the decision block 420 may be combined with step 415, such that the determination to set MORE FRAMES bit to zero and send the time reference may be performed on the last available data frame in the transmission queue.

Figure 5:
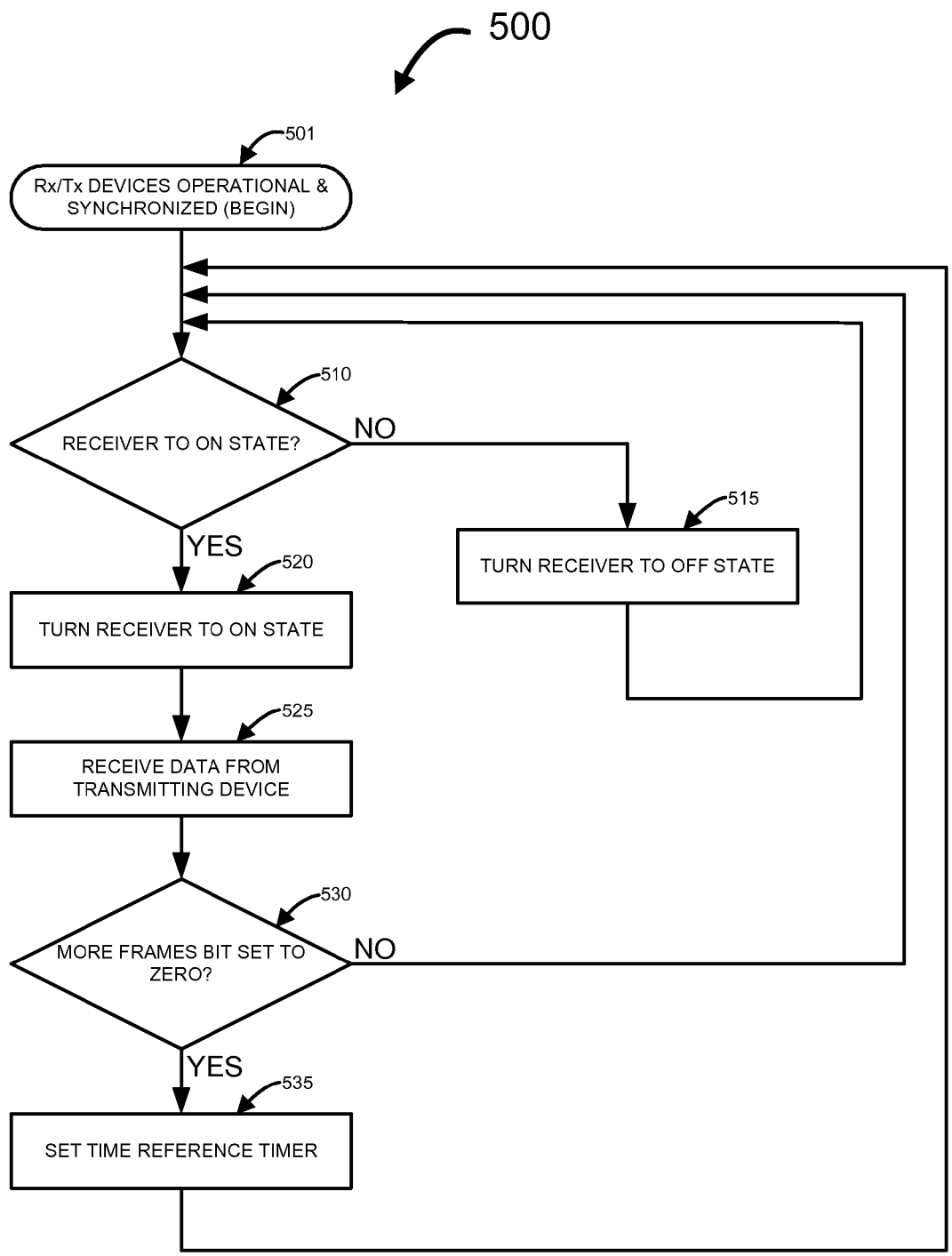
FIG. 5 illustrates selected steps and decision blocks of a process for receiving traffic at the receiving device in accordance with the modified protocol that includes the time reference.

FIG. 5 illustrates selected steps of a process 500 for receiving traffic at the receiving device 140 from the transmitting device 120 in accordance with the modified protocol that includes a time reference for the MORE FRAMES bit.

At flow point 501, the transmitting and the receiving devices are operational and synchronized with each other.

In decision block 510, the receiving device determines whether its receiver needs to be in the On state. In case of the DRP reservation scheme, for example, this determination may entail detecting expiration of the timer set to expire at the end of the time period defined by the last received time reference value, and determining whether the current time falls within a DRP reservation block. In case of the PCA scheme, for example, the determination may include detecting expiration of the reference timer and determining whether the receiver's PCA Availability IE and the transmitter's TIM IE permit PCA transmissions during the current MAS.

If the receiver does not need to be in the On state, process flow goes to step 515 to selectively turn the receiver to the Off state (or keep it in the Off state), and then loops back to the input of the decision block 510. The receiver is turned Off selectively in the sense that other conditions may be considered in turning the receiver to the Off state, such as transmissions from device other than the device 120.

If the receiver needs to be turned to the On state, as determined in the decision block 510, process flow advances to step 520, to turn the receiver to the On state.

In step 525, the receiving device receives traffic and/or other data from the transmitting device. The other data may include the latest MORE FRAMES bit and value of the time reference field.

In decision block 530, the receiving device determines whether the MORE FRAMES bit is set to zero. If the bit is not set to zero, process flow returns to the input of the decision block 510. Otherwise, process flow advances to step 535, in which it sets the timer corresponding to the latest time reference value.

From the step 535 process flow returns to the input to the decision block 510, and the steps and decision blocks 510 through 530 repeat.

Selected examples provided above illustrate the use of the time reference to shorten (compared to the baseline without the time reference) the time during which the transmitter commits not to transmit. It is also possible to lengthen the commitment time (again, compared to the baseline without the time reference). In this way, energy conservation at the receiver may be improved. Thus, when using the DRP reservations scheme, the time reference may be made longer than the time remaining until the next reservation block. For example, the reservation block immediately following the setting of the MORE FRAMES bit to zero may be skipped in part, so that the receiving device turns on its receiver some time in the middle of the immediately following block. The block may also be entirely skipped, so that the receiving device turns on its receiver at the beginning or middle of a subsequent block.

Although steps and decision blocks of various methods may have been described serially in this disclosure, some of these steps and decisions may be performed by separate elements in conjunction or in parallel, asynchronously or synchronously, in a pipelined manner, or otherwise. There is no particular requirement that the steps and decisions be performed in the same order in which this description lists them, except where explicitly so indicated, otherwise made clear from the context, or inherently required. It should be noted, however, that in selected variants the steps and decisions are performed in the particular sequences described above and/or shown in the accompanying Figures. Furthermore, not every illustrated step and decision may be required in every system, while some steps and decisions that have not been specifically illustrated may be desirable or necessary in some systems.

Those of skill in the art would understand that the communication techniques that are described in this document may be used for unidirectional traffic transmissions as well as for bidirectional traffic transmissions.

Those of skill in the art would also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software, or combinations of both. To show clearly this interchangeability of hardware and software, various illustrative components, blocks, modules, circuits, and steps may have been described above generally in terms of their functionality. Whether such functionality is implemented as hardware, software, or combination of hardware and software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm that may have been described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in an access terminal. Alternatively, the processor and the storage medium may reside as discrete components in an access terminal.

The previous description of the disclosed embodiments is provided to enable any person skilled in the art to make or use the present invention. Various modifications to these embodiments will be readily apparent to those skilled in the art, and the generic principles defined herein may be applied to other embodiments. Thus, the present invention is not intended to be limited to the embodiments shown herein, but is to be accorded the widest scope consistent with the principles and novel features disclosed herein.

What is claimed is:

1. A method for sending wireless transmissions, the method comprising:
    transmitting payload data from a first device to a second device in response to the payload data being available;
    determining that the payload data for transmitting from the first device to the second device is unavailable;
    transmitting a first value of an indicator from the first device to the second device in response to determining that the payload data for transmitting from the first device to the second device is unavailable, wherein the first value of the indicator indicates that the first device will not transmit to the second device for a first period of time;
    transmitting a first time reference value from the first device to the second device, the first time reference value replacing the first period of time, and the first time reference value being transmitted in response to determining that the payload data for transmitting from the first device to the second device is unavailable, wherein the first time reference value defines a second period of time that is less than the first period of time, and wherein the first device will not transmit to the second device during the second period of time;
    transmitting a second value of the indicator from the first device to the second device in response to the payload data being available, the step of transmitting the second value of the indicator being performed before the steps of transmitting the first value of the indicator and transmitting the first time reference value, wherein the second value of the indicator indicates that the first device will transmit the payload data to the second device;
    wherein: the first device is configured to transmit to the second device in accordance with ECMA-368 standard, the transmitting the first value of the indicator comprises transmitting a MORE FRAMES bit set to zero, and the transmitting the second value of the indicator comprises transmitting the MORE FRAMES bit set to one; and
    the transmitting the payload data is performed in a superframe, and the transmitting the first time reference value is performed in the superframe.

2. The method of claim 1, wherein the transmitting the payload data is performed using Distributed Reservation Protocol (DRP) reservations.

3. The method of claim 1, wherein the transmitting the payload data is performed using unreserved Prioritized Contention Access (PCA).

4. The method of claim 1, wherein the transmitting the payload data is performed using Prioritized Contention Access Distributed Reservation Protocol (PCA DRP).

5. The method of claim 1, wherein the transmitting the payload data is performed using Prioritized Contention Access (PCA) transmission during soft Distributed Reservation Protocol (DRP).

6. The method of claim 1, wherein the transmitting the payload data is performed using Distributed Reservation Protocol (DRP) reservations in a first reservation block of the superframe, wherein the first period of time ends after beginning of a second reservation block of the superframe, the second reservation block beginning after the first reservation block.

7. The method of claim 1, wherein the transmitting the payload data is performed using Distributed Reservation Protocol (DRP) reservations in a reservation block of the superframe, wherein the first period of time ends before end of the reservation block.

8. The method of claim 1, wherein the transmitting the first time reference value comprises transmitting the first time reference value in an enhanced MAC header of a Zero-length Data frame.

9. The method of claim 1, wherein the transmitting the first time reference value comprises transmitting the first time reference value in an enhanced MAC header of a Command frame.

10. The method of claim 1, wherein the transmitting the first time reference value comprises transmitting the first time reference value in a vendor-specific Command Frame payload.

11. The method of claim 1, further comprising: selecting the first time reference value from a plurality of time reference values based at least in part on patterns of traffic in a network that comprises the first and the second devices.

12. The method of claim 1: selecting the first time reference value from a plurality of time reference values based at least in part on sensitivity of application generating the payload data to latency and to throughput of the payload data.

13. The method of claim 1, further comprising:
    storing at the first device a plurality of time reference values;
    selecting the first time reference value from the plurality of time reference values;
    in response to the payload being unavailable upon expiration of the second period of time, (1) transmitting the first value of the indicator from the first device to the second device, (2) selecting a second time reference value from the plurality of time reference values, the second time reference value being different from the first time reference value, and (3) transmitting the second time reference value from the first device to the second device;
    wherein the transmitting the first value in response to the payload being unavailable upon expiration of the second period of time indicates that the first device will not transmit the payload data to the second device for a third period of time, the third period of time having a length defined by the second time reference value.

14. A wireless apparatus comprising:
    a memory;
    a receiver;
    a transmitter;
    a controller coupled to the receiver, the transmitter, and the memory, and wherein the controller is configured to:
        transmit payload data from a first device to a second device in response to the payload data being available;
        determine that the payload data for transmitting from the wireless apparatus to a wireless device is unavailable,
        transmit a first value of an indicator from the wireless apparatus to the wireless device when the payload data is determined to be unavailable, wherein the first value of the indicator indicates that the wireless apparatus will not transmit to the wireless device for a first period of time, transmit a first time reference value from the wireless apparatus to said wireless device, the first time reference value replacing the first period of time, and the first time reference value being transmitted when the payload data is determined to be unavailable, wherein the first time reference value defines a second period of time that is less than the first period of time, and wherein the wireless apparatus will not transmit to the wireless device during the second period of time;

wherein the controller is further configured to transmit a second value of the indicator from the wireless apparatus to the wireless device if the payload data is available, before transmitting the first value of the indicator and the first time reference value, and wherein the second value of the indicator indicates that the wireless apparatus will transmit the payload data to the wireless device; and, wherein: the wireless apparatus is configured to transmit to the wireless device in accordance with ECMA-368 standard, the indicator is a MORE FRAMES bit, the first value of the indicator is zero, and the second value of the indicator is one; and the controller is configured to transmit the payload data and the first time reference value in a superframe.

15. The wireless apparatus of claim 14, wherein the controller is configured to transmit the payload data using Distributed Reservation Protocol (DRP) reservations.

16. The wireless apparatus of claim 14, wherein the controller is configured to transmit the payload data using unreserved Prioritized Contention Access (PCA).

17. The wireless apparatus of claim 14, wherein the controller is configured to transmit the payload data using Prioritized Contention Access Distributed Reservation Protocol (PCA DRP).

18. The wireless apparatus of claim 14, wherein the controller is configured to transmit the payload data using Prioritized Contention Access (PCA) transmission during soft Distributed Reservation Protocol (DRP).

19. The wireless apparatus of claim 14, wherein the controller is configured to transmit the first time reference value in an enhanced MAC header of a Zero-length Data frame.

20. The wireless apparatus of claim 14, wherein the controller is configured to transmit the first time reference value in an enhanced MAC header of a Command frame.

21. The wireless apparatus of claim 14, wherein the controller is configured to transmit the first time reference value in a vendor-specific Command Frame payload.

22. The wireless apparatus of claim 14, wherein the controller is further configured to select the first time reference value from a plurality of time reference values based at least in part on patterns of traffic in a network that comprises the wireless apparatus and the wireless device.

23. The wireless apparatus of claim 14, wherein the controller is further configured to select the first time reference value from a plurality of time reference values based at least in part on sensitivity to power savings of the wireless device and to current battery charge level of the wireless device.

24. The wireless apparatus of claim 14, wherein the controller is further configured to: select the first time reference value from a plurality of time reference values; and in response to unavailability of the payload data upon expiration of the second period of time, (1) transmit the first value of the indicator from the wireless apparatus to the wireless device, (2) select a second time reference value from the plurality of time reference values, the second time reference value being different from the first time reference value, and (3) transmit the second time reference value from the wireless apparatus to the wireless device, wherein transmission of the first value in response to unavailability of the payload data upon the expiration of the second period of time indicates that the wireless apparatus will not transmit the payload data to the wireless device for a third period of time, the third period of time having a length defined by the second time reference.

25. A computer-readable storage device comprising instructions, wherein when the instructions are executed by at least one controller of a wireless apparatus, the instructions cause the wireless apparatus to perform:

transmiting payload data from a first device to a second device in response to the payload data being available;

determining that the payload data for transmitting from the wireless apparatus to a wireless device is unavailable, transmitting a first value of an indicator from the wireless apparatus to the wireless device when the payload data is determined to be unavailable, wherein the first value of the indicator indicates that the wireless apparatus will not transmit to the wireless device for a first period of time, and transmitting a first time reference value from the wireless apparatus to said wireless device, the first time reference value replacing the first period of time, and the first time reference value being transmitted when the payload data is determined to be unavailable, wherein the first time reference value defines a second period of time that is less than the first period of time, and wherein the wireless apparatus will not transmit to the wireless device during the second period of time;

transmitting a second value of the indicator from the wireless apparatus to the wireless device in response to the payload data being available, the transmitting the second value of the indicator being performed before the transmitting the first value of the indicator and transmitting the first time reference value, and wherein the second value of the indicator indicates that the wireless apparatus will transmit the payload data to the wireless device;

transmiting to the wireless device in accordance with ECMA-368 standard, the transmitting the first value of the indicator comprises transmitting a MORE FRAMES bit set to zero, and the transmitting the second value of the indicator comprises transmitting the MORE FRAMES bit set to one; and the transmitting the payload data is performed in a superframe, and the transmitting the first time reference value is performed in the superframe.

26. The computer-readable storage device of claim 25, wherein the transmitting the payload data is performed using Distributed Reservation Protocol (DRP) reservations.

27. The computer-readable storage device of claim 25, wherein the transmitting the payload data is performed using unreserved Prioritized Contention Access (PCA).

28. The computer-readable storage device of claim 25, wherein the transmitting the payload data is performed using Prioritized Contention Access Distributed Reservation Protocol (PCA DRP).

29. The computer-readable storage device of claim 25, wherein the transmitting the payload data is performed using Prioritized Contention Access (PCA) transmission during soft Distributed Reservation Protocol (DRP).

30. The computer-readable storage device of claim 25, wherein the transmitting the first time reference value comprises transmitting the first time reference value in an enhanced MAC header of a Zero-length Data frame.

31. The computer-readable storage device of claim 25, wherein the transmitting the first time reference value comprises transmitting the first time reference value in an enhanced MAC header of a Command frame.

32. The computer-readable storage device of claim 25, wherein the transmitting the first time reference value comprises transmitting the first time reference value in a vendor-specific Command Frame payload.

33. The computer-readable storage device of claim 25, wherein the instructions further cause the wireless apparatus to perform: selecting the first time reference value from a plurality of time reference values based at least in part on patterns of traffic in a network that comprises the wireless apparatus and the wireless device.

34. The computer-readable storage device of claim 25, wherein the instructions further cause the wireless apparatus to perform: selecting the first time reference value from a plurality of time reference values based at least in part on sensitivity to power savings of the wireless device and to current battery charge level of the wireless device.

35. The computer-readable storage device of claim 25, wherein the instructions further cause the wireless apparatus to perform:
  selecting the first time reference value from a plurality of time reference values stored at the wireless apparatus;
  in response to unavailability of the payload data upon expiration of the second period of time, (1) transmitting the first value of the indicator from the wireless apparatus to the wireless device, (2) selecting a second time reference value from the plurality of time reference values, the second time reference value being different from the first time reference value, and (3) transmitting the second time reference value from the wireless apparatus to the wireless device;
  wherein the step of transmitting the first value in response to the unavailability of the payload data upon the expiration of the second period indicates that the wireless apparatus will not transmit the payload data to the wireless device for a third period of time, the third period of time having a length defined by the second time reference value.

36. A method of operating a wireless device, the method comprising:
  receiving payload data from a wireless apparatus;
  receiving an indicator from the wireless apparatus;
  determining that the indicator has a first value that indicates that the wireless apparatus will not transmit to the wireless device for a first length of time;
  receiving a time reference value from the wireless apparatus, the time reference value replacing the first length of time, and the time reference value being transmitted in response to the indicator having the first value, wherein the time reference value defines a second length of time that is less than the first length of time, and wherein the wireless apparatus will not transmit to the wireless device during the second length of time;
  selecting the second length of time corresponding to the time reference value;
  turning at least part of a receiver of the wireless device to an off state for the second length of time; and
  turning said at least part of the receiver to an on state upon expiration of the second length of time;
  transmitting a second value of the indicator from the first device to the second device in response to the payload data being available, the step of transmitting the second value of the indicator being performed before the steps of transmitting the first value of the indicator and transmitting the first time reference value, wherein the second value of the indicator indicates that the first device will transmit the payload data to the second device;
  wherein: the first device is configured to transmit to the second device in accordance with ECMA-368 standard, the transmitting the first value of the indicator comprises transmitting a MORE FRAMES bit set to zero, and the transmitting the second value of the indicator comprises transmitting the MORE FRAMES bit set to one; and
  the transmitting the payload data is performed in a superframe, and the transmitting the first time reference value is performed in the superframe.

37. A wireless device comprising:
  a memory;
  a receiver;
  a transmitter; and
  a controller coupled to the receiver, the transmitter, and the memory, the controller is configured to:
    receive payload data from a wireless apparatus;
    receive an indicator from the wireless apparatus;
    determine that the indicator has a first value that indicates that the wireless apparatus will not transmit to the wireless device for a first length of time;
    receive a time reference value from the wireless apparatus, the time reference value replacing the first length of time, and the time reference value being transmitted in response to the indicator having the first value, wherein the time reference value defines a second length of time that is less than the first length of time, and wherein the wireless apparatus will not transmit to the wireless device during the second length of time;
    select the second length of time corresponding to the time reference value;
    turn at least part of a receiver of the wireless device to an off state for the second length of time; and
    turn said at least part of the receiver to an on state upon expiration of the second length of time;
  wherein the controller is further configured to transmit a second value of the indicator from the wireless apparatus to the wireless device if the payload data is available, before transmitting the first value of the indicator and the first time reference value, and wherein the second value of the indicator indicates that the wireless apparatus will transmit the payload data to the wireless device; and,
  wherein: the wireless apparatus is configured to transmit to the wireless device in accordance with ECMA-368 standard, the indicator is a MORE FRAMES bit, the first value of the indicator is zero, and the second value of the indicator is one; and the controller is configured to transmit the payload data and the first time reference value in a superframe.

38. A non-transitory computer-readable storage device comprising instructions, wherein when the instructions are executed by at least one controller of a wireless device, the instructions cause the wireless device to perform:
  receiving payload data from a wireless apparatus;
  receiving an indicator from the wireless apparatus;
  determining that the indicator has a first value that indicates that the wireless apparatus will not transmit to the wireless device for a first length of time;
  receiving a time reference value from the wireless apparatus, the time reference value replacing the first length of time, and the time reference value being transmitted in response to the indicator having the first value, wherein the time reference value defines a second length of time that is less than the first length of time, and wherein the wireless apparatus will not transmit to the wireless device during the second length of time;

selecting the second length of time corresponding to the time reference value;

turning at least part of a receiver of the wireless device to an off state for the second length of time; and turning said at least part of the receiver to an on state upon expiration of the second length of time;

transmitting a second value of the indicator from the wireless apparatus to the wireless device in response to the payload data being available, the transmitting the second value of the indicator being performed before the transmitting the first value of the indicator and transmitting the first time reference value, and wherein the second value of the indicator indicates that the wireless apparatus will transmit the payload data to the wireless device;

transmiting to the wireless device in accordance with ECMA-368 standard, the transmitting the first value of the indicator comprises transmitting a MORE FRAMES bit set to zero, and the transmitting the second value of the indicator comprises transmitting the MORE FRAMES bit set to one; and the transmitting the payload data is performed in a superframe, and the transmitting the first time reference value is performed in the superframe.

\* \* \* \* \*